United States Patent
Ito et al.

(10) Patent No.: US 10,006,395 B2
(45) Date of Patent: Jun. 26, 2018

(54) APPARATUS AND METHOD FOR CONTROLLING INTERNAL COMBUSTION ENGINE

(71) Applicant: Nissan Motor Co., Ltd., Yokohama-shi, Kanagawa (JP)

(72) Inventors: Yukinobu Ito, Kanagawa (JP); Yukimi Mizuno, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days. days.

(21) Appl. No.: 15/124,868

(22) PCT Filed: Jan. 26, 2015

(86) PCT No.: PCT/JP2015/052021
§ 371 (c)(1),
(2) Date: Sep. 9, 2016

(87) PCT Pub. No.: WO2015/156013
PCT Pub. Date: Oct. 15, 2015

(65) Prior Publication Data
US 2017/0016409 A1  Jan. 19, 2017

(30) Foreign Application Priority Data

Apr. 11, 2014 (JP) ................. 2014-081782

(51) Int. Cl.
*F02D 41/28* (2006.01)
*F02D 41/08* (2006.01)
(Continued)

(52) U.S. Cl.
CPC ............. *F02D 41/28* (2013.01); *F02D 41/08* (2013.01); *F02D 41/182* (2013.01);
(Continued)

(58) Field of Classification Search
CPC ........ F02D 41/28; F02D 41/08; F02D 41/222; F02D 41/182; F02D 2041/286; G01F 15/06
See application file for complete search history.

(56) References Cited

U.S. PATENT DOCUMENTS 5,563,340 A * 10/1996 Clowater .............. G01F 1/6842
73/114.34
5,635,635 A *  6/1997 Tsukada ................ F02D 41/187
73/114.34
(Continued)

FOREIGN PATENT DOCUMENTS

JP        62261638 A  * 11/1987
JP        01073147 A  *  3/1989
(Continued)

*Primary Examiner* — Joseph Dallo
(74) *Attorney, Agent, or Firm* — Global IP Counselors, LLP

(57) ABSTRACT

A heat-ray type of airflow meter has a signal processor for converting a detected intake air quantity into a frequency signal. An engine controller has a conversion table for converting the frequency signal into an air quantity. The signal processor and the conversion table have features such that the frequency increases as the magnitude of a positive air quantity increases, and the frequency decreases as an absolute value of a negative air quantity increases. In the conversion table, a prescribed positive air quantity value is assigned a dummy output for frequencies lower than a prescribed threshold value. Under normal circumstances, frequencies lower than a minimum value are not used. The frequency decreases to near 0 Hz when there is a disconnection or a short circuit, the dummy output is therefore output, and an injection quantity equal to or greater than a misfire limit is ensured.

9 Claims, 4 Drawing Sheets

(51) Int. Cl.
*F02D 41/18* (2006.01)
*F02D 41/22* (2006.01)
*G01F 15/06* (2006.01)

(52) U.S. Cl.
CPC ........... *F02D 41/222* (2013.01); *G01F 15/06* (2013.01); *F02D 2041/286* (2013.01)

(56) References Cited

U.S. PATENT DOCUMENTS

| | | | | |
|---|---|---|---|---|
| 6,152,102 | A * | 11/2000 | Ruman | F02B 17/00 123/295 |
| 6,457,353 | B1 * | 10/2002 | Kanke | F01L 9/04 73/114.42 |
| 6,619,140 | B2 * | 9/2003 | Kitahara | G01F 1/6842 73/202.5 |
| 6,629,456 | B2 * | 10/2003 | Kohno | G01F 1/6845 73/204.26 |
| 6,697,743 | B2 * | 2/2004 | Aono | G01F 1/6965 702/126 |
| 6,708,561 | B2 * | 3/2004 | Zurek | G01F 1/6842 73/202.5 |
| 6,990,856 | B2 * | 1/2006 | Dempsey | F02D 41/182 73/114.33 |
| 7,596,991 | B2 * | 10/2009 | Redon | F02D 41/18 73/114.31 |
| 7,631,550 | B2 * | 12/2009 | Mukai | F02D 41/18 73/114.33 |
| 7,631,551 | B2 * | 12/2009 | Wang | F02D 41/18 73/114.37 |
| 8,706,381 | B2 * | 4/2014 | Donar | F02D 41/18 701/103 |
| 2002/0045982 | A1 * | 4/2002 | Aono | F02D 41/187 701/102 |
| 2003/0136196 | A1 * | 7/2003 | Wiklund | F15B 15/2838 73/716 |
| 2004/0093956 | A1 * | 5/2004 | Straight | G01F 1/6842 73/861.08 |
| 2004/0250610 | A1 * | 12/2004 | Dempsey | F02D 41/182 73/114.34 |

FOREIGN PATENT DOCUMENTS

| | | | |
|---|---|---|---|
| JP | 01244139 A | * | 9/1989 |
| JP | 2009-270483 A | | 11/2009 |
| JP | 2013-054013 A | | 3/2013 |
| JP | 2013-204581 A | | 10/2013 |
| JP | 2014-20210 A | | 2/2014 |

* cited by examiner

500
APPARATUS AND METHOD FOR CONTROLLING INTERNAL COMBUSTION ENGINE

CROSS-REFERENCE TO RELATED APPLICATIONS

This application is a U.S. National stage application of International Application No. PCT/JP2015/052021, filed Jan. 26, 2015, which claims priority to Japanese Patent Application No. 2014-081782, filed on Apr. 11, 2014.

BACKGROUND

Field of the Invention

This invention relates to a control device and control method for an internal combustion engine that controls a fuel injection amount according to an intake air quantity that is detected by an airflow meter.

Background Information

In general, the fuel injection amount of an internal combustion engine is controlled by detecting the intake air quantity per unit of time by an airflow meter that is disposed in an intake passage, and adjusting so as to have an appropriate air-fuel ratio (for example a theoretical air-fuel ratio) with respect to the intake air quantity per one cycle that is calculated from the intake air quantity per one unit of time and the engine rotational speed. For example, an airflow meter that is provided immediately after an air cleaner is positioned away from an engine controller that carries out a step to calculate the fuel injection amount, and is connected to the engine controller via a wiring harness.

One example of the fuel injection amount of an internal combustion engine being controlled based on intake air quantity is disclosed in Japanese Laid-Open Patent Application No. 2009-270483, which discloses disposing a high-response type of airflow meter that can detect intake air pulsation or a momentary reverse flow in an intake passage.

As described above, since the airflow meter is connected to the engine controller via a wiring harness, there is the possibility that the signal path may be disconnected. Generally, some type of fail-safe mode is provided to counter the loss of the intake air quantity signal due to a disconnection of the airflow meter, in which the mode transitions to a fail-safe mode that does not depend on an airflow meter, such as simply obtaining the fuel injection amount from a throttle valve opening amount and the engine rotational speed, or fixing the throttle valve opening amount to a predetermined opening amount and inferring the intake air quantity according to the engine rotational speed.

However, a certain amount of delay time is necessary after the airflow meter is disconnected in order to transition to the fail-safe mode, including the time required for diagnosis so as to prevent an erroneous transition to the fail-safe mode due to noise, etc. Therefore, since a signal that gives an appearance that the intake air quantity is zero (or a negative flow) is output from the airflow meter during this delay time, the fuel injection amount becomes extremely small, and there is the possibility that a misfire may occur before transitioning to the fail-safe mode.

SUMMARY

In accordance with one aspect of the present disclosure, a control device for an internal combustion engine is provided that comprising an airflow meter and an engine controller. The airflow meter is provided in an intake passage. The engine controller controls the fuel injection amount of an internal combustion engine according to the intake air quantity that is detected by this airflow meter. The airflow meter is configured to output a positive air quantity for flows in a forward direction and a negative air quantity for flows in an opposite direction as a frequency signal having predetermined features, such that the frequency increases in correspondence with increases in the magnitude of the positive air quantity, and the frequency decreases in correspondence with increases in the absolute value of a negative air quantity. The engine controller has a conversion table for converting the frequency signal to an air quantity and in this table, a positive air quantity is assigned a dummy output in a frequency region that is lower than a predetermined frequency that corresponds to a negative air quantity.

In the above-described configuration, when the airflow meter is normal, a signal having a frequency corresponding to the air quantity that flows in the intake passage is sent from the airflow meter to the engine controller, which is converted to an air quantity on the engine side using a table, and then used for controlling the fuel injection amount.

On the other hand, if a disconnection occurs between the airflow meter and the engine controller, the frequency of the signal that is received by the engine controller becomes near zero. In the present invention, a more appropriate positive air quantity is output as a dummy output by a conversion through a table in such a frequency region near zero.

Therefore, the fuel injection amount does not become extremely small even when the airflow meter is disconnected.

According to this invention, since an appropriate positive air quantity is output as a dummy output when the airflow meter is disconnected, it is possible to avoid a misfire caused by a reduction in the fuel injection amount. In particular, since the invention can be substantially applied by only setting a table and does not require a diagnosis of the disconnection, it is possible to immediately respond to a disconnection of the airflow meter, without entailing a delay.

DETAILED DESCRIPTION OF THE EMBODIMENTS

One embodiment of this invention will be described in detail below based on the drawings.

Figure 1:
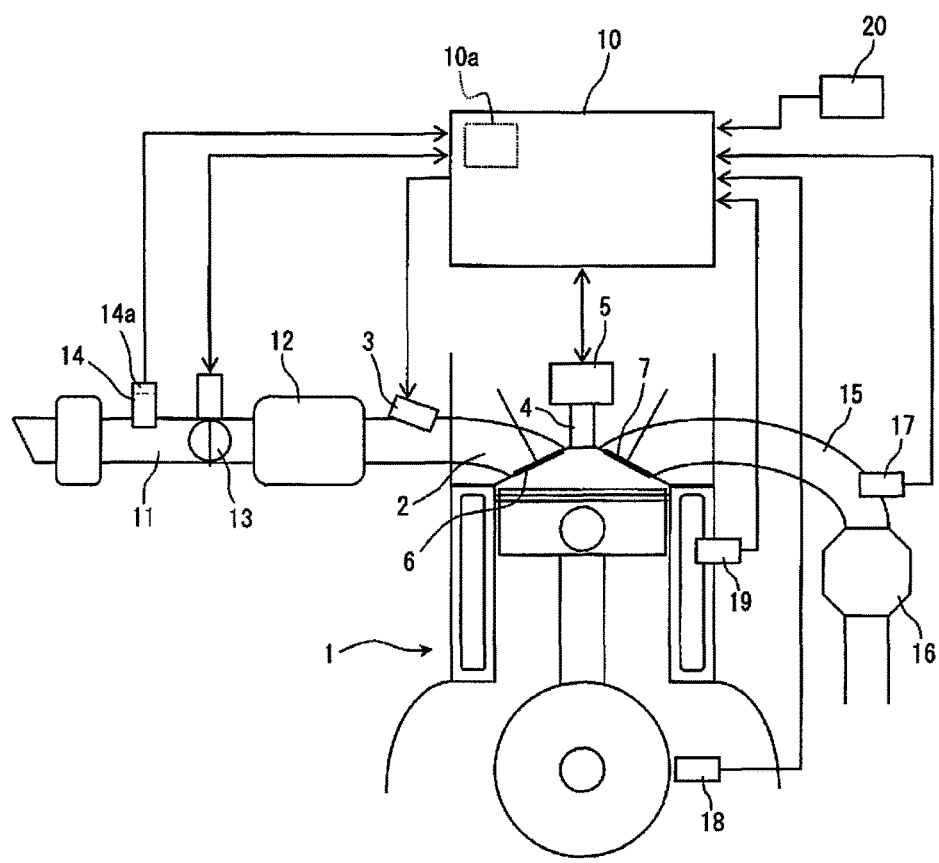
FIG. 1 is a diagrammatic view illustrating a system configuration of an internal combustion engine to which the present invention is applied.

FIG. 1 illustrates the system configuration of an automotive internal combustion engine 1 to which this invention is applied. The internal combustion engine 1 is, for example, a port injection type of spark-ignition internal combustion engine, comprising, for each cylinder, a fuel injection valve 3 that injects fuel toward an intake port 2. In addition, the combustion chamber of each cylinder is equipped with an intake valve 6 and an exhaust valve 7, and is also provided with a spark plug 4 in the center portion. The spark plug 4 is individually connected to a spark unit 5 that is provided for each cylinder. The fuel injection valve 3 and the spark unit 5 are controlled by an engine controller 10.

An electronically controlled throttle valve 13, the opening amount of which is controlled by a control signal from the engine controller 10, is disposed on the upstream side of an intake air collector 12 in an intake passage 11 that is connected to the intake port 2, and an airflow meter 14 that detects the intake air quantity is disposed further on the upstream side thereof.

A catalytic device 16, consisting of a three-way catalyst, is disposed in the exhaust passage 15, and an air-fuel ratio sensor 17 that detects the exhaust air-fuel ratio is disposed on the upstream side thereof.

Other than the airflow meter 14 and the air-fuel ratio sensor 17 described above, detection signals from sensors, such as a crank angle sensor 18 for detecting the engine rotational speed, a water temperature sensor 19 for detecting the cooling water temperature, and an accelerator position opening amount sensor 20 for detecting the depression amount of the accelerator pedal which is operated by the driver, are input into the engine controller 10. The engine controller 10 optimally controls the fuel injection amount and the injection timing by the fuel injection valve 3, the ignition timing by the spark plug 4, and the opening amount of the throttle valve 13, etc., based on these detection signals.

Excluding a portion of the driving region, the fuel injection amount is controlled to be the theoretical air-fuel ratio by a feedback control. Specifically, using the intake air quantity Qa that is detected by the airflow meter 14 and the engine rotational speed N that is detected by the crank angle sensor 18, a basic fuel injection amount Tp is calculated as $Tp=Qa \times K/N$ (K is a constant). Then, using a feedback correction coefficient $\alpha$ that is based on the detection signal of the air-fuel ratio sensor 17, the actual injection pulse width Ti that is applied to the fuel injection valve 3 is calculated as $Ti=Tp \times (1+COEF) \times \alpha$. COEF are various weighting correction coefficients based on the water temperature and the like. This type of step to calculate the fuel injection amount is executed in the engine controller 10.

The airflow meter 14 that detects the intake air quantity is made from, for example, a high response heat-ray type of mass flowmeter, and the detection unit thereof is disposed in the flow channel of the intake passage 11. In addition, this airflow meter 14 has a built-in signal processor 14a that converts a current value signal that is obtained by a detection unit to a frequency signal having a predetermined characteristic and outputs the same, and the frequency signal is input into the engine controller 10 to which the airflow meter 14 is connected via the wiring harness as a signal that indicates the air quantity. The engine controller 10 has a conversion table 10a for converting the frequency signal to an air quantity, and reads the value converted to an air quantity via this conversion table 10a, for example, per each sampling cycle. In this manner, the robustness against noise is increased by carrying out sending and receiving of sensor signals between the engine controller 10 and the airflow meter 14, which are positioned apart from each other, by conversion to a frequency signal.

Figure 2:
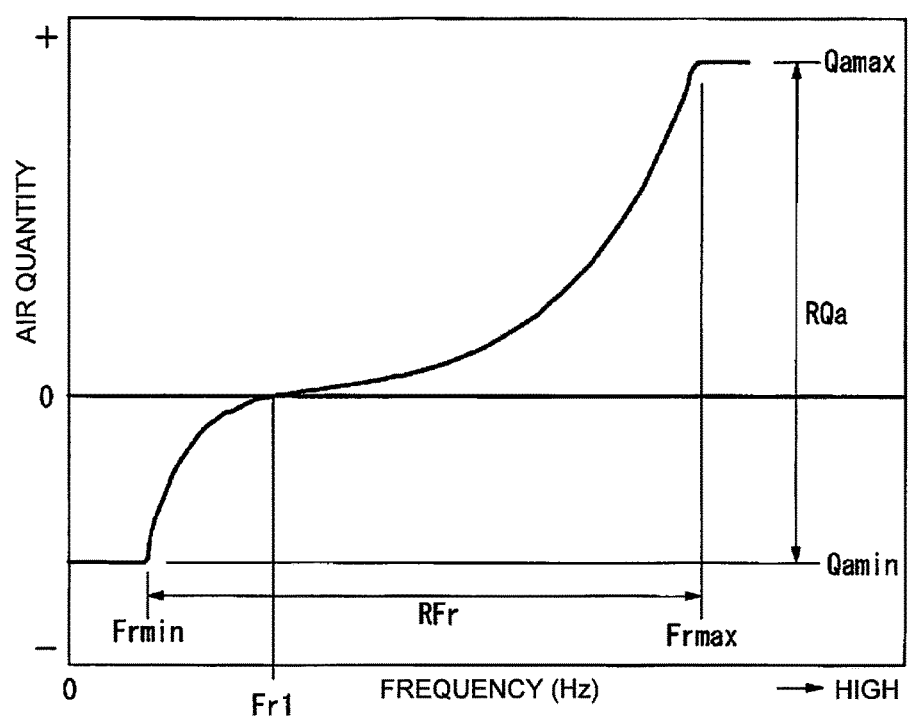
FIG. 2 is a characteristic graph illustrating a relationship between an air quantity in an airflow meter and an output signal.

FIG. 2 is a characteristic graph illustrating the relationship between the air quantity that flows in the intake passage 11 and the frequency of the frequency signal that is output through the signal processor 14a, wherein the vertical axis indicates the air quantity (in other words, the current value that is obtained by the detection unit) and the horizontal axis indicates the frequency of the frequency signal. Other than being able to detect the air quantity that flows in the intake passage 11 in the forward direction (direction from the distal end opening of the intake passage 11 toward the combustion chamber) (this shall be the positive air quantity) with high responsiveness, the airflow meter 14 can detect the air quantity that momentarily flows in the reverse direction due to intake air pulsation, or the like, as the negative air quantity, and a predetermined frequency range (illustrated in FIG. 2 as the range RFr from the minimum value Frmin to the maximum value Frmax) is assigned with respect to a predetermined air quantity detection range which spans the positive air quantity to the negative air quantity (illustrated in FIG. 2 as the range RQa from the minimum value Qamin to the maximum value Qamax), so as to have a desired resolution. Specifically, the airflow meter has a characteristic such that the frequency increases in correspondence with increases in the magnitude of the positive air quantity, and the frequency decreases in correspondence with increases in the absolute value of the negative air quantity. Additionally, when the air quantity is zero, the frequency becomes a certain intermediate frequency Fr1. The air quantity detection range RQa encompasses the entire range of air quantities that can be generated as an intake system, and a flow in the forward direction that is greater than the maximum value Qamax or a flow in the reverse direction that is greater than the absolute value of the minimum value Qamin will basically not be generated.

Here, the minimum value Frmin of the frequency that corresponds to the minimum value Qamin of the air quantity is not 0 (Hz). Therefore, while a frequency signal in the low frequency region from 0 (Hz) to the minimum value Frmin is considered to correspond to the minimum value Qamin of the air quantity in terms of signal processing, as long as the airflow meter 14 and the signal processor 14a are functioning normally, the region on the lower frequency side of the minimum value Frmin is not used.

As described above, the output signal of the airflow meter 14 that is converted to a frequency signal is input to the engine controller 10 via the wiring harness, and is converted again to an air quantity in the engine controller 10.

Figure 3:
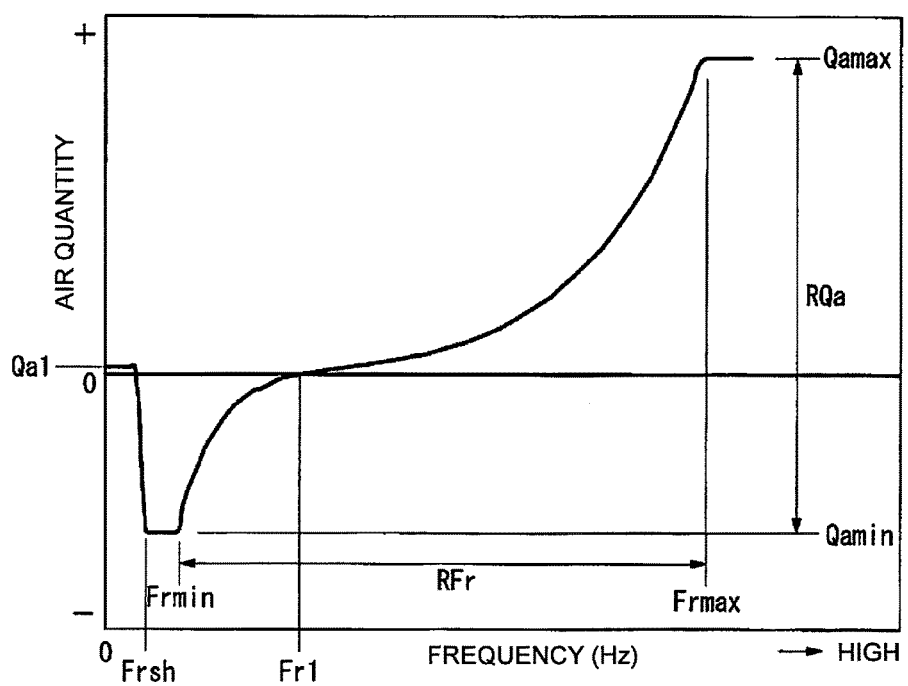
FIG. 3 is a characteristic graph illustrating the characteristic of a conversion table in the engine controller.

FIG. 3 illustrates the characteristics of a conversion table 10a for converting the frequency signal to an air quantity in the engine controller 10. Basically, this has the same characteristics as the signal processor 14a of the airflow meter 14 illustrated in FIG. 2, and the air quantity values (positive and negative values) in the air quantity range RQa from the minimum value Qamin to the maximum value Qamax are respectively assigned to each value in the frequency range RFr from the minimum value Frmin to the maximum value Frmax. Therefore, the engine controller 10 is capable of reading the air quantity, for example, per each sampling cycle based on the frequency signal that is output by the airflow meter 14. Since a negative air quantity indicates a momentary reverse flow component due to, for example, pulsation, the true air quantity can be obtained by subtracting the summation of the negative air quantity from the summation of the positive air quantity during a predetermined period (for example during one cycle).

Here, in the present embodiment, a predetermined positive air quantity value Qa1 is assigned as a dummy output for frequencies lower than a predetermined threshold value Frsh, in a region on the lower frequency side of the minimum value Frmin of the frequency, as illustrated in FIG. 3. As described above, this region on the lower frequency side of the frequency threshold value Frsh is not used under normal circumstances.

The positive air quantity Qa1 that is output as the dummy output is set so that it is possible to obtain a fuel injection amount that is equal to or greater than the misfire limit, when at least the opening amount of the throttle valve 13 is at an idling opening amount. The interval between the threshold value Frsh and the minimum value Frmin of the frequency is nothing but a margin against noise, etc., and is not necessarily required; however, since the threshold value Frsh needs only to be set to a relatively low frequency, it is preferable to provide an appropriate margin between the threshold value Frsh and the minimum value Frmin of the frequency, as in the illustrated example.

According to the configuration of the above-described embodiment, if the airflow meter 14, the signal processor 14a, and the wiring harness are in a normal state, the frequency changes within the frequency range RFr that corresponds to the air quantity detection range RQa, and the air quantity is properly detected.

In contrast, if the wiring harness is disconnected between the airflow meter 14 and the engine controller 10, the frequency of the frequency signal that is input to the engine controller 10 becomes substantially 0 Hz. Therefore, the air quantity value that is read via the conversion table 10a becomes the positive air quantity Qa1, which is a dummy output. As described above, a basic fuel injection amount Tp is calculated in the engine controller 10, based on the positive air quantity Qa1. Accordingly, a fuel injection amount that is at least more than the misfire limit during idling is ensured and it is possible to suppress misfires caused by becoming excessively lean.

Also in a case in which the wiring harness between the airflow meter 14 and the engine controller 10 is short circuited, since the frequency of the frequency signal becomes substantially 0 Hz, the positive air quantity Qa1 which is a dummy output will be read in the same way.

Figure 4:
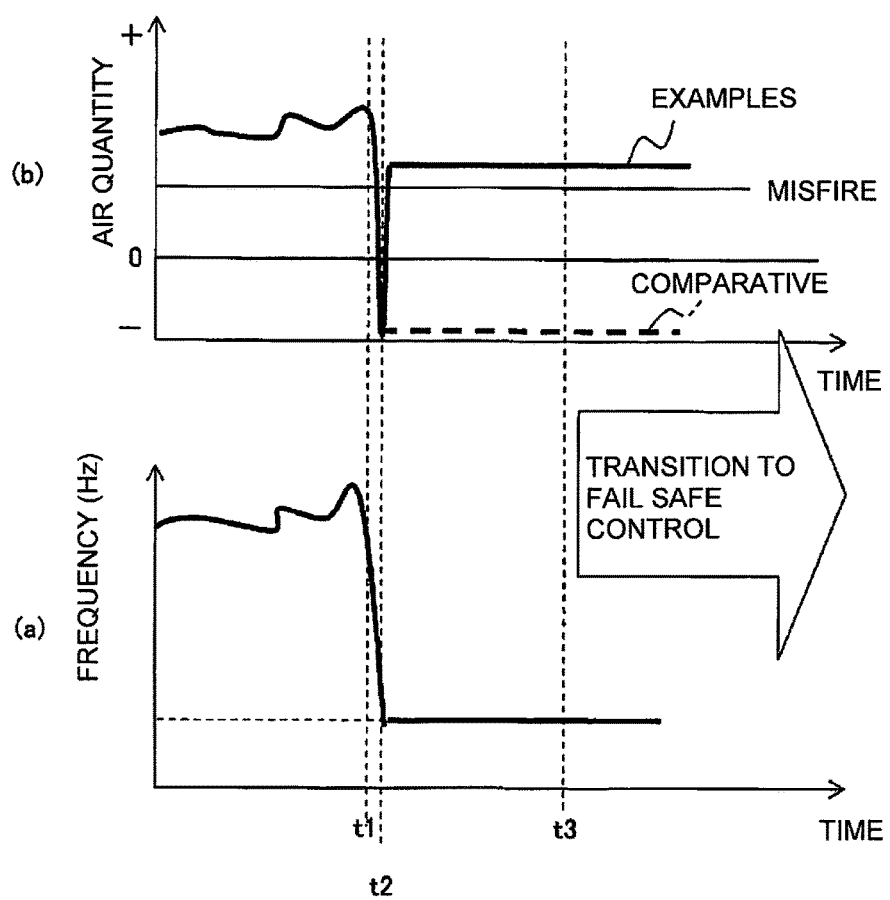
FIG. 4 is a pair of time graphs illustrating comparisons between (a) input change and (b) detected air quantity at the time of a disconnection.

FIG. 4 is a time chart for explaining the signal change during a disconnection (or a short circuit) of the wiring harness; (a) in the figure illustrates the frequency of the frequency signal that is input from the signal processor 14a of the airflow meter 14 to the engine controller 10, and (b) illustrates the air quantity that is read by the engine controller 10 side via the conversion table 10a.

In the example of FIG. 4, a disconnection or a short circuit of the wiring harness occurs at time t1, and the frequency of the frequency signal that is input to the engine controller 10 becomes substantially 0 Hz at an immediately subsequent time t2. In the engine controller 10, such a disconnection or a short circuit of the wiring harness is diagnosed from an abnormality in the frequency signal, and the mode transitions from a normal mode to a predetermined fail-safe mode at time t3. The fail-safe mode is a mode for carrying out an operation without depending on the airflow meter 14, such as by simply obtaining the fuel injection amount from a throttle valve 13 opening amount and the engine rotational speed N, or fixing the throttle valve 13 opening amount to a predetermined opening amount and inferring the intake air quantity according to the engine rotational speed N. In order to avoid an erroneous diagnosis due to noise, or the like, a delay time of, for example, about several hundred ms exists between time t2 and time t3.

On the other hand, since the frequency of the signal that is input to the engine controller 10 becomes equal to or less than the threshold value Frsh, the air quantity that is read by the engine controller 10 via the conversion table 10a becomes the positive air quantity Qa1, which is a dummy output, after time t2. Accordingly, until time t3 at which point the mode transitions to the fail-safe mode, the amount of fuel that is calculated based on this air quantity Qa1 is injected from the fuel injection valve 3. Accordingly, misfires are avoided and a self-sustained operation is continued between time t2 and time t3.

In this manner, in the above-described embodiment, when the input signal becomes equal to or less than the threshold value Frsh due to a disconnection or a short circuit, a positive air quantity Qa1, which is a dummy output, is immediately output, without requiring a diagnosis of a disconnection or a short circuit. Therefore, it is not necessary to entail a complex control for diagnosis, and moreover the problem of response delay essentially does not exist.

Here, if a dummy output is not set, as in the comparative example indicated by the dashed line, the air quantity is read as if it is a negative value accompanying a reduction in the frequency of the input signal and, as a result, the fuel injection amount is excessively reduced. Therefore, even if equipped with a fail-safe mode, there is the possibility that misfire may occur during the time until time t3 at which the mode is actually transitioned to the fail-safe mode.

In the present invention, the presence/absence of a fail-safe mode is arbitrary, and the present invention can be applied even when not provided with a fail-safe mode. If a fail-safe mode is not provided, for example, an operation by a dummy output will be continued along with a lighting of a warning light.

The invention claimed is:

1. An internal combustion engine control device for an internal combustion engine, comprising:
    an airflow meter configured to detect an intake air quantity in an intake passage of the internal combustion engine; and
    an engine controller programmed to control a fuel injection amount of an internal combustion engine according to the intake air quantity that is detected by the airflow meter,
    the airflow meter being further configured to output a frequency signal indicating a magnitude and a direction of the detected intake air quantity, the direction being positive when the intake air flows in a forward direction and negative when the intake air flows in an opposite direction, a frequency of the frequency signal increasing as the magnitude of the detected intake air quantity increases when the direction is positive and decreasing as the magnitude of the detected intake air quantity increases when the direction is negative, and
    the engine controller including a conversion table for converting the frequency signal to an air quantity, the table being configured to assign a dummy output as the air quantity in a low frequency region that is lower than a predetermined frequency threshold value, the dummy output being a positive air quantity and the predetermined frequency threshold value corresponding to a negative air quantity according to the conversion table.

2. The internal combustion engine control device according to claim 1, wherein
    the positive air quantity assigned as the dummy output is set to correspond to a fuel injection amount that is equal to or greater than a misfire limit of the internal combustion engine during idling.

3. The internal combustion engine control device according to claim 1, wherein
    the airflow meter is a heat-ray type of airflow meter that includes a signal processor configured to generate and output the frequency signal.

4. The internal combustion engine control device according to claim 1, wherein the low frequency region is set to a frequency that is lower than a minimum value of a predetermined frequency range corresponding to an air quantity detection range.

5. An internal combustion engine control method for an internal combustion engine, comprising:
  detecting a magnitude and a direction of an intake air quantity using an airflow meter provided in an intake passage of the internal combustion engine the direction being positive when the intake air flows in a forward direction and negative when the intake air flows in an opposite direction;
  converting the detected intake air quantity to a frequency signal, a frequency of the frequency signal increasing as the magnitude of the detected intake air quantity increases when the direction is positive, and the frequency of the frequency signal decreasing as the magnitude of the of the detected intake air quantity increases when the direction is negative;
  outputting the frequency signal to an engine controller;
  converting the frequency signal to an air quantity at the engine controller using a predetermined conversion table, the conversion table being configured to assign a dummy output as the air quantity when the frequency of the frequency signal is lower than a predetermined frequency threshold value corresponding to a negative air quantity according to the table, the dummy output being a positive air quantity; and
  controlling, using the engine controller, a fuel injection amount based on the air quantity obtained using the table.

6. The internal combustion engine control method according to claim 5, wherein
  the controlling of the fuel injection amount is switched to a fail-safe mode that does not depend on the airflow meter upon diagnosing an abnormality in the frequency signal due to a wiring harness being disconnected or short circuited between the airflow meter and the engine controller.

7. The internal combustion engine control device according to claim 2, wherein
  the airflow meter is a heat-ray type of airflow meter that includes a signal processor configured to generate and output the frequency signal.

8. The internal combustion engine control device according to claim 2, wherein
  the low frequency region is set to a frequency that is lower than a minimum value of a predetermined frequency range corresponding to an air quantity detection range.

9. The internal combustion engine control device according to claim 3, wherein
  the low frequency region is set to a frequency that is lower than a minimum value of a predetermined frequency range corresponding to an air quantity detection range.

* * * * *